US012208613B2

(12) United States Patent
Billow et al.

(10) Patent No.: US 12,208,613 B2
(45) Date of Patent: Jan. 28, 2025

(54) INTEGRATION OF A LINE-SCAN CAMERA ON A SINGLE PASS INKJET PRINTER

(71) Applicant: Electronics for Imaging, Inc., Londonderry, NH (US)

(72) Inventors: Steven A. Billow, Bow, NH (US); Ghilad Dziesietnik, Palo Alto, CA (US); John A. Weismantel, Gilford, NH (US); Darin Schick, Northville, MI (US); Boris Liberman, Belleville, MI (US); Noam Rabin, Fremont, CA (US); Hsinchia Chen, Fremont, CA (US)

(73) Assignee: ELECTRONICS FOR IMAGING, INC., Londonderry, NH (US)

( * ) Notice: Subject to any disclaimer, the term of this patent is extended or adjusted under 35 U.S.C. 154(b) by 0 days.

(21) Appl. No.: 18/321,947

(22) Filed: May 23, 2023

(65) Prior Publication Data

US 2023/0286260 A1 Sep. 14, 2023

Related U.S. Application Data

(63) Continuation of application No. 17/336,195, filed on Jun. 1, 2021, now Pat. No. 11,691,413, which is a continuation-in-part of application No. 16/686,939, filed on Nov. 18, 2019, now Pat. No. 11,040,528, which is a continuation of application No. 15/603,304, filed on May 23, 2017, now Pat. No.
(Continued)

(51) Int. Cl.

| | |
|---|---|
| ***B41J 2/045*** | (2006.01) |
| ***B41J 2/21*** | (2006.01) |
| ***B41J 29/393*** | (2006.01) |

(52) U.S. Cl.
CPC ....... *B41J 2/04505* (2013.01); *B41J 2/04586* (2013.01); *B41J 2/2142* (2013.01); *B41J 2/2146* (2013.01)

(58) Field of Classification Search
CPC .............. B41J 2/045045; B41J 2/04586; B41J 2/2142; B41J 2/2146; B41J 2/0451; B41J 2/04508; B41J 2/04506; B41J 2/04505; B41J 2/155; B41J 29/393; B41J 2029/3935; B41J 3/545
See application file for complete search history.

(56) References Cited

U.S. PATENT DOCUMENTS

| | | | |
|---|---|---|---|
| 6,270,187 | B1 | 8/2001 | Murcia et al. |
| 8,810,810 | B2 | 8/2014 | Ohama |

(Continued)

FOREIGN PATENT DOCUMENTS

| | | | |
|---|---|---|---|
| CN | 101228780 | A | 7/2008 |
| JP | 2006137115 | A | 6/2006 |

(Continued)

*Primary Examiner* — Jason S Uhlenhake
(74) *Attorney, Agent, or Firm* — PERKINS COIE LLP

(57) ABSTRACT

Disclosed is an industrial single-pass inkjet printer/press incorporating a line-scan camera. The line-scan camera enables system software to inspect every sheet for quality assurance purposes. These inspection results are tied back to a digital printer to take one or more of several possible actions. Actions include ensuring a particular number of acceptable prints are generated and sorted. Actions further include performing nozzle checks without pausing or interrupting production orders.

41 Claims, 12 Drawing Sheets

Related U.S. Application Data

10,513,110, which is a continuation-in-part of application No. 14/304,824, filed on Jun. 13, 2014, now Pat. No. 9,914,309.

(60) Provisional application No. 62/340,984, filed on May 24, 2016.

(56) References Cited

U.S. PATENT DOCUMENTS

| | | | | |
|---|---|---|---|---|
| 9,844,961 | B1 * | 12/2017 | Mantell | B41J 2/16579 |
| 9,939,386 | B2 | 4/2018 | Lewis et al. | |
| 9,953,435 | B2 | 4/2018 | Fergen et al. | |
| 2001/0017710 | A1 | 8/2001 | Sugitou et al. | |
| 2002/0051144 | A1 | 5/2002 | Ilbery et al. | |
| 2003/0063275 | A1 | 4/2003 | Hubble et al. | |
| 2006/0139663 | A1 | 6/2006 | Ilbery et al. | |
| 2008/0018702 | A1 | 1/2008 | Jeong | |
| 2008/0059120 | A1 | 3/2008 | Xiao et al. | |
| 2008/0273060 | A1 | 11/2008 | Kuwahara et al. | |
| 2009/0079780 | A1 * | 3/2009 | Picciotto | B41J 29/393<br>347/14 |
| 2009/0184990 | A1 | 7/2009 | Shang et al. | |
| 2010/0039471 | A1 | 2/2010 | Walmsley et al. | |
| 2010/0296834 | A1 | 11/2010 | Omori | |
| 2010/0296854 | A1 * | 11/2010 | Otsuki | B65H 9/106<br>400/582 |
| 2011/0074861 | A1 | 3/2011 | Saettel et al. | |
| 2011/0075193 | A1 | 3/2011 | Kumamoto et al. | |
| 2011/0096119 | A1 | 4/2011 | Ito | |
| 2012/0062642 | A1 | 3/2012 | Jimenez et al. | |
| 2012/0194600 | A1 * | 8/2012 | Kido | B41J 2/2146<br>347/19 |
| 2013/0016154 | A1 | 1/2013 | Imamura et al. | |
| 2013/0155139 | A1 | 6/2013 | Elliot et al. | |
| 2013/0293611 | A1 | 11/2013 | Ueshima | |
| 2014/0079292 | A1 | 3/2014 | Kaneko et al. | |
| 2015/0077464 | A1 | 3/2015 | Silveston-Keith et al. | |
| 2015/0138266 | A1 | 5/2015 | Chen et al. | |
| 2015/0336381 | A1 | 11/2015 | Kyoso et al. | |
| 2015/0360491 | A1 | 12/2015 | Billow et al. | |
| 2016/0129709 | A1 * | 5/2016 | Nolting | B65H 29/62<br>347/104 |
| 2016/0136983 | A1 | 5/2016 | Koehler et al. | |
| 2016/0283833 | A1 * | 9/2016 | Peek | G06K 15/021 |
| 2017/0341372 | A1 | 11/2017 | Billow et al. | |
| 2020/0086631 | A1 | 3/2020 | Billow et al. | |
| 2021/0138796 | A1 | 5/2021 | Kondo | |
| 2021/0291513 | A1 | 9/2021 | Billow et al. | |

FOREIGN PATENT DOCUMENTS

| | | | |
|---|---|---|---|
| JP | 2008238409 | A | 10/2008 |
| JP | 2012095065 | A | 5/2012 |
| JP | 2013067044 | A | 4/2013 |
| JP | 2015120264 | A | 7/2015 |
| KR | 20060115125 | A | 11/2006 |
| WO | 2015117943 | A1 | 8/2015 |

* cited by examiner

INTEGRATION OF A LINE-SCAN CAMERA ON A SINGLE PASS INKJET PRINTER

CROSS-REFERENCE TO RELATED APPLICATIONS

This application is a continuation of U.S. patent application Ser. No. 17/336,195, filed on Jun. 1, 2021, which is a continuation-in-part of U.S. patent application Ser. No. 16/686,939, filed on Nov. 18, 2019, now U.S. Pat. No. 11,040,528, issued on Jun. 22, 2021, which is a continuation of U.S. patent application Ser. No. 15/603,304 filed on May 23, 2017, now U.S. Pat. No. 10,513,110, issued on Dec. 24, 2019, which is a continuation-in-part of U.S. patent application Ser. No. 14/304,824 filed on Jun. 13, 2014, now U.S. Pat. No. 9,914,309, issued on Mar. 13, 2018, and claims priority to U.S. provisional patent application No. 62/340,984, filed May 24, 2016, each of which are incorporated herein in their entirety by this reference thereto.

TECHNICAL FIELD

Techniques disclosed concern single pass inkjet printers. More specifically, techniques disclosed pertain to imaging of the output of single pass inkjet printers and printer actions enabled by imaging techniques.

BACKGROUND

Inspection of printers and printer output, especially of industrial printers, is performed requiring notable manual labor. Likewise, cameras or scanners are used to assist in printer set up, but these operations typically do not occur inline during regular production.

Presently, line-scan cameras are used on web presses. Web presses operate on large rolls of paper that spool forward (out) and backward (in). The line-scan cameras record the paper roll as it spools out. Once complete, the paper roll is removed and taken to another apparatus known as a re-winder. The re-winder unwinds the paper roll in a play-back inspection to the location of a recorded defect and then enables a human operator to cut out the bad section, re-splice. This process is repeated for each recorded error in the roll.

SUMMARY

Embodiments of the invention incorporate an in-line camera on single-pass inkjet printing presses that inspects sheets for quality assurance purposes. The inspection results are tied back to a digital printer to take one or more of several possible actions without operator intervention. A first action could include coordination between system software and a stacker to divert printer output that fails a quality criterion into a reject stream. In this manner, a user requests a particular number of acceptable outputs, and the stacker sorts between acceptable and rejected sheets. Extras acceptable sheets are not printed and therefore wasted. The sorting occurs without stopping the printer or with human intervention.

A second action could include causing corrective action that reduces or eliminates defects without stopping. For example, corrective action includes nozzle adjustments. A third action, relating to severe defects, or repeating defects that occur on successive sheets, that require more intensive corrective action, could cause the printer to pause or stop, perform repairs (perhaps automatically) and then resume printing.

The above line-scan camera, and the correction actions the camera enables may additionally be integrated into a network, or web-based printer.

BRIEF DESCRIPTION OF THE DRAWINGS

One or more embodiments of the present disclosure are illustrated by way of example and not limitation in the figures of the accompanying drawings, in which like references indicate similar elements.

Those skilled in the art will appreciate that the logic and process steps illustrated in the various flow diagrams discussed below may be altered in a variety of ways. For example, the order of the logic may be rearranged, sub-steps may be performed in parallel, illustrated logic may be omitted, other logic may be included, etc. One will recognize that certain steps may be consolidated into a single step and that actions represented by a single step may be alternatively represented as a collection of sub-steps. The figures are designed to make the disclosed concepts more comprehensible to a human reader. Those skilled in the art will appreciate that actual data structures used to store this information may differ from the figures and/or tables shown, in that they, for example, may be organized in a different manner; may contain more or less information than shown; may be compressed, scrambled and/or encrypted, etc.

DETAILED DESCRIPTION

Various example embodiments will now be described. The following description provides certain specific details for a thorough understanding and enabling description of these examples. One skilled in the relevant technology will understand, however, that some of the disclosed embodiments may be practiced without many of these details.

Likewise, one skilled in the relevant technology will also understand that some of the embodiments may include many other obvious features not described in detail herein. Additionally, some well-known structures or functions may not be shown or described in detail below, to avoid unnecessarily obscuring the relevant descriptions of the various examples.

The terminology used below is to be interpreted in its broadest reasonable manner, even though it is being used in conjunction with a detailed description of certain specific examples of the embodiments. Indeed, certain terms may even be emphasized below; however, any terminology intended to be interpreted in any restricted manner will be overtly and specifically defined as such in this Detailed Description section.

Figure 1:
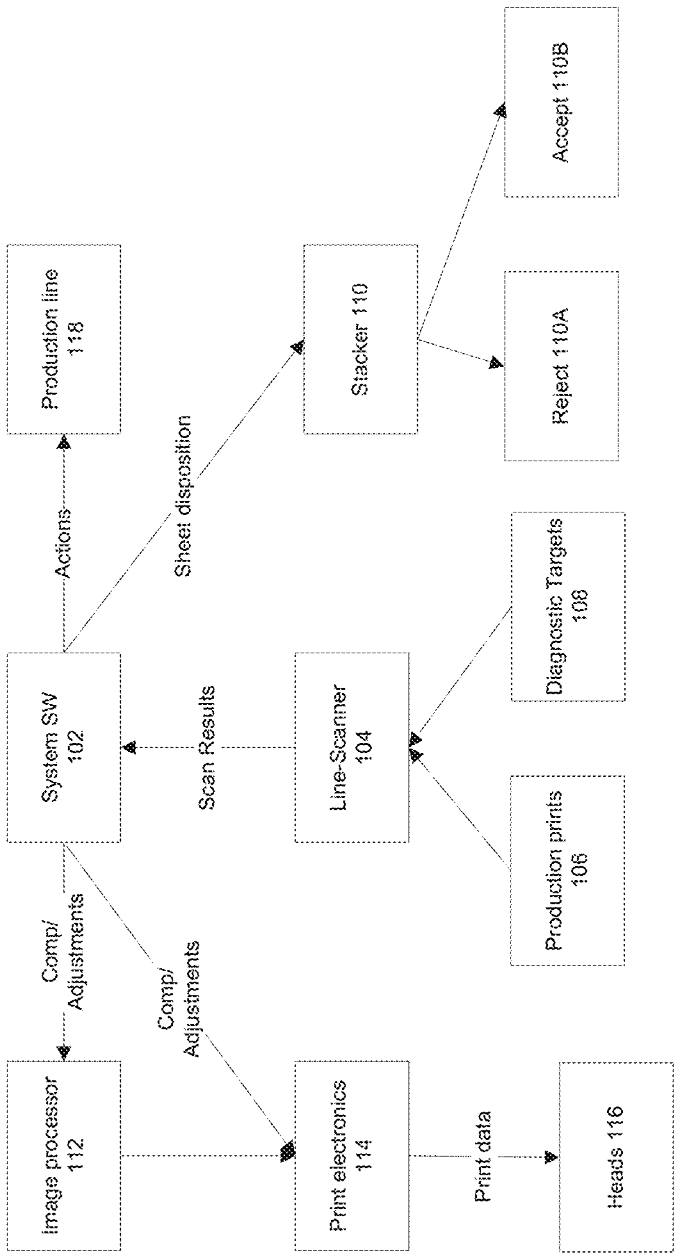
FIG. 1 is a schematic diagram illustrating logical process blocks pertaining to a line-scan camera integrated into a single pass inkjet printer.

FIG. 1 is a schematic diagram illustrating logical process blocks pertaining to control of a line-scan camera integrated into a single pass inkjet printer. Central to the control process is the system software 102. This system software may reside in one or more computing elements, including but not limited to a computer dedicated to the printing operation, a computer dedicated to the scanning operation, a programmable logic controller (PLC) for controlling the system, the image processor, or in a computing element that is shared across several of these functions. The line-scanner 104 provides input to the system software 102. By incorporating a vision system into the printer, embodiments of the invention maximize productivity and uptime of the product and optimize the printed output in a largely-automated fashion. For example, in a printer with a 100 or more print heads, manually measuring and adjusting each print head would be very time consuming and arduous. Likewise, to maximize uptime, it is necessary to have a ready response to nozzle drop outs. It is also important to detect missing nozzles during the production and compensate without losing notable productivity.

The line-scan camera 104 receives input from scans of the production prints 106, and likewise from the scans of diagnostic targets 108 that are not specifically part of a production order. Diagnostic targets 108 include specially designed targets that are printed in addition to or alongside of the production prints; these targets are designed in a way to highlight aspects of printer performance such as nozzle jetting performance, print head alignments, density uniformity, etc. After the line-scanner 104 transmits the scan results to the printer SW 102, the system software is enabled to execute a number of actions.

System software 102 coordinates the disposition of printer sheets as each leaves the production line onto a stacker 110. Equipped with the scan results, the print software 102 compares the scan to a reference of what the printer expects each print sheet to look like. The system software 102 makes a determination to accept or reject the print sheet. The determination is based off a threshold of errors. The stacker directs rejected print sheets to a rejected sheet repository, while accepted sheets are placed in a completed work repository. In this manner, a user does not have to sort reject print sheets out of the final printer output before initiating further use of the printer output.

System software 102 further coordinates with image processing 112 when comparing scan results to the reference specification/master image and can effect changes to the master image or processing of the image for printing. Coordinating with the printer electronics 114 and heads 116 enables nozzle and print head adjustments. Finally, coordinating with the production line 118 enables the printer to pause or shut down to effect repairs or make other adjustments during the production run.

Figure 2:
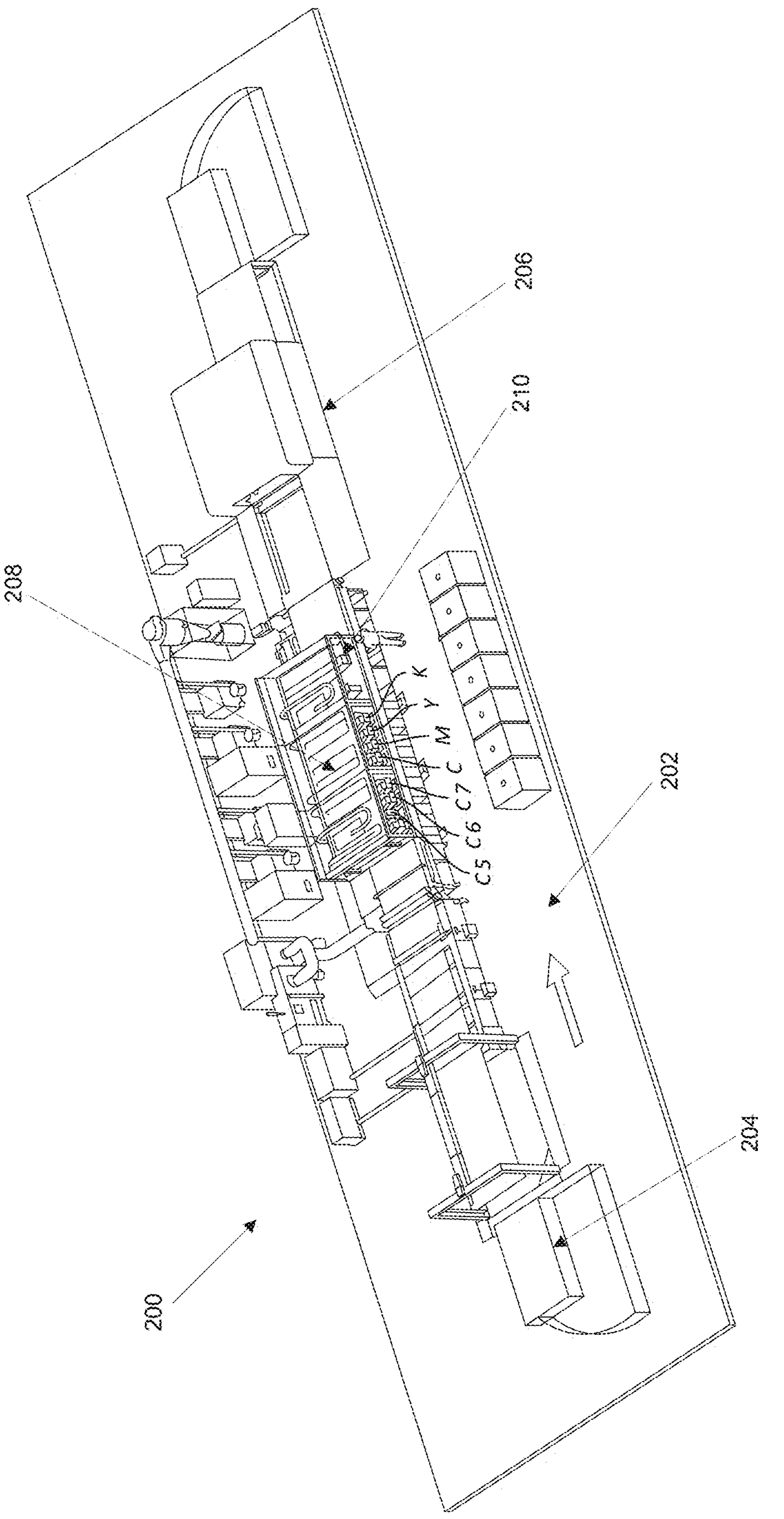
FIG. 2 is an illustration of a single-pass inkjet printer with an integrated line-scan camera.

FIG. 2 is an illustration of a single-pass inkjet printer with an integrated line-scan camera. The illustrated printer 200 is for industrial use. The printer 200 includes a production line 202 including a conveyor system (in this case, left to right) for propelling sheets along through the printer 200. On the left side of the production line 202 is the sheet bay 204 from which the production line 202 draws sheets. On the far right side of the production line 202 is a stacker 206. The stacker 206 directs printed sheets to reject or accept repositories.

In the center of the production line 202 is the single-pass inkjet 208. The inkjet depicted includes 7 inks, though in various embodiments of a single-pass inkjet a number of ink colors may be selected. The particular inkjet 208 pictured includes a number of bays to insert various inks. As sheets pass below the inkjet 208 (a single time), the nozzles of the print head apply ink to the sheets.

To the right side of the inkjet 208, is a line-scan camera 210, mounted in an adjacent bay. A number of methods may be employed in order to mount the line-scan camera, though it is merely relevant that the line-scan camera 210 have coverage across an axis perpendicular to the major axis of the production line 202. The line-scan camera 210 communicates scan results directly to a control processing device (not pictured). The control processing device directs the functions of all the printer hardware.

As an example of function of the line-scan camera, a user may request 1000 sheets printed of a given design. The end result, without additional human intervention, will be 1000 matching prints in an acceptable pile as directed by the stacker 206. The stacker 206 places the prints containing errors in a reject pile, and the processor does not count those prints with respect to the 1000 requested prints.

This process differs from presently used methods where users often work in an average printer error rate to their requested print count. For example, the user would request 1100 prints, and hope that 1000 of those were acceptable. The user would partake in a time consuming process to sort the 1100 print by hand in order to remove the error prints. The user doesn't actually know if 1000 of those sheets include errors. It is possible that merely 10 of those would contain errors, then there are 90 extras. Use of a line-scan camera prevents this sort of waste.

Figure 3:
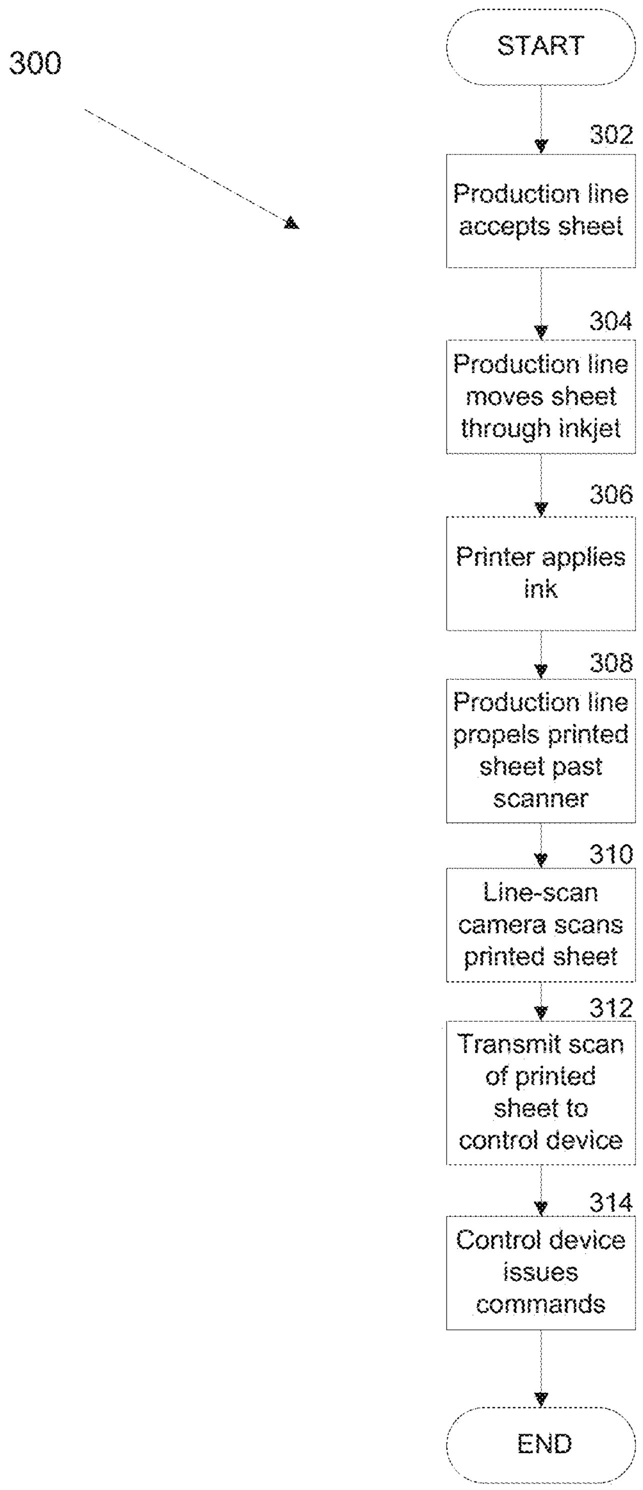
FIG. 3 is a flowchart illustrating a process of operation for a single-pass inkjet printer with a line-scan camera.

FIG. 3 is a flowchart illustrating a process of operation for a single-pass inkjet printer with a line-scan camera. In step 302, the production line draws a sheet on to the conveyor. In step 304, the production line moves the sheet along the production line towards and through the single-pass inkjet. In step 306, the printer applies ink to the sheet. In step 308, the production line continues to propel the sheet through the line-scan camera. In step 310, the line-scan camera scans the printed sheet.

In step 312, the line-scan camera transmits the scan of the printed sheet to a control device. The control device may be a computer connected to the printer physically, or through a wireless connection. In step 314, the control device evaluates the scan and issues a command to the printer hardware based upon the evaluation.

Figure 4:
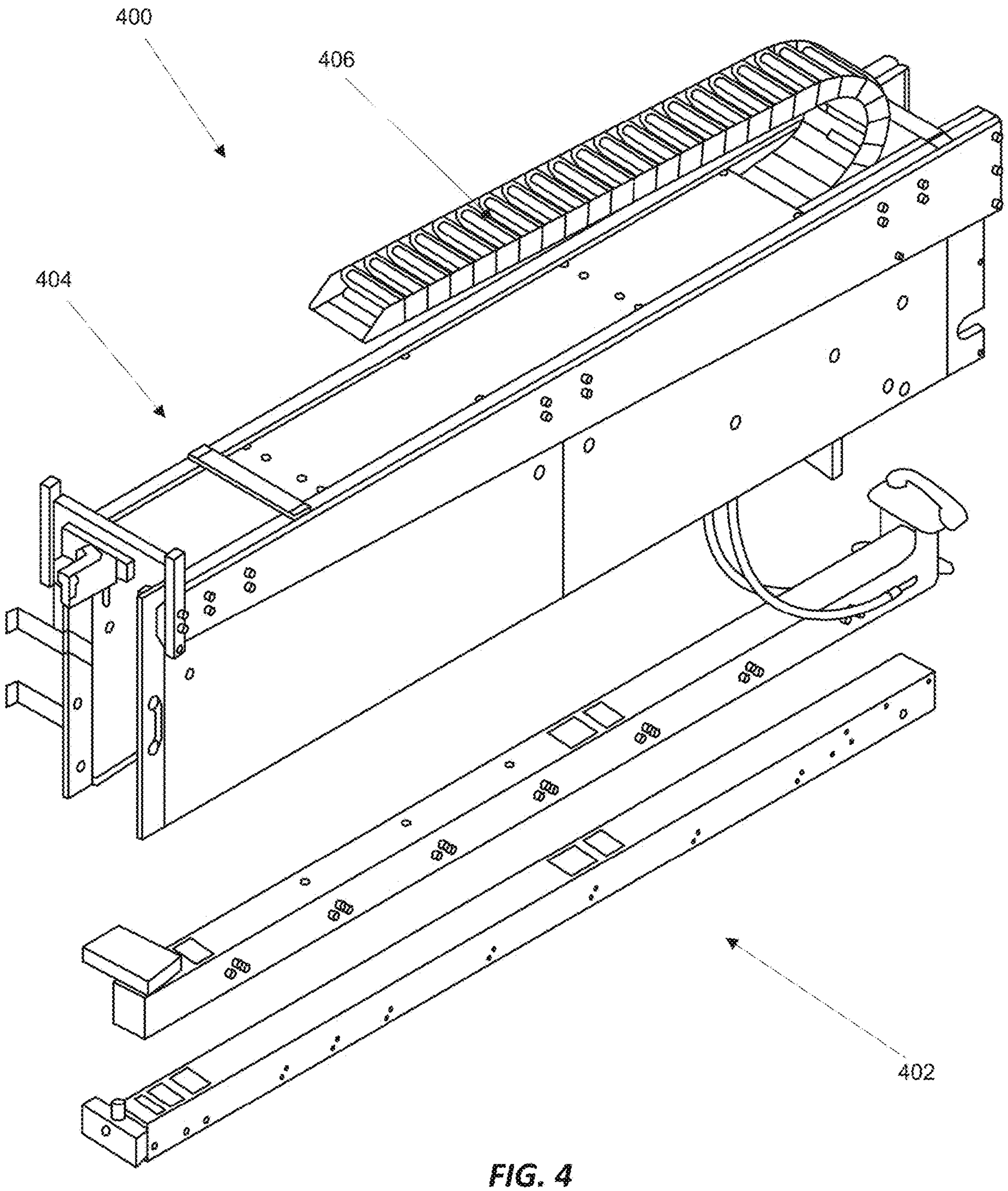
FIG. 4 is an illustration of a line-scan module for an industrial single-pass inkjet printer.

FIG. 4 is an illustration of a line-scan module 400 for an industrial single-pass inkjet printer. In some embodiments, the line-scan printer camera 402 is installed in a module that is mounted with the inkjet. The line-scan module 400 has similar mounting procedures as the inkjet print heads. The mechanical mounting interface 404 used to secure components being bonded is constructed so as to not impart preload forces that cause dimensional changes after being removed from the fixture. Ideally, the mounting mechanism 404 is common to both the fixture and the printer to eliminate, or reduce, the potential for additional position errors beyond the as-built accuracy of the fixture itself.

The mounting mechanism 404 provides a rigid and repeatable positioning of the connecting bodies that is also able to be disassembled. Exact constraint principles provide many possible solutions for designing a three dimensional connection mechanism between objects. One example of this is a kinematic coupling consisting of three rigidly mounted spheres that nest respectively against a rigidly mounted trihedral cup, vee cup, and a flat. This provides exact constraint between the two connecting bodies. That is to say, all six degrees of freedom are constrained with exactly six points of contact.

By mounting the integrated line-scan camera and print heads using the same mounting design, and including independent adjustment of both the print heads and integrated line-scan camera allows for alignment to the varying media height throughout the entire length of the print area.

Further depicted in the figure is an umbilical chain 406, that enables the line-scan camera 402 to easily slide away from the production line while maintaining electrical and communicative connections to the rest of the printer hardware. While the line-scan camera 402 is pulled away from the production line, a user may examine the hardware and perform adjustments or maintenance that may be necessary.

Figure 5:
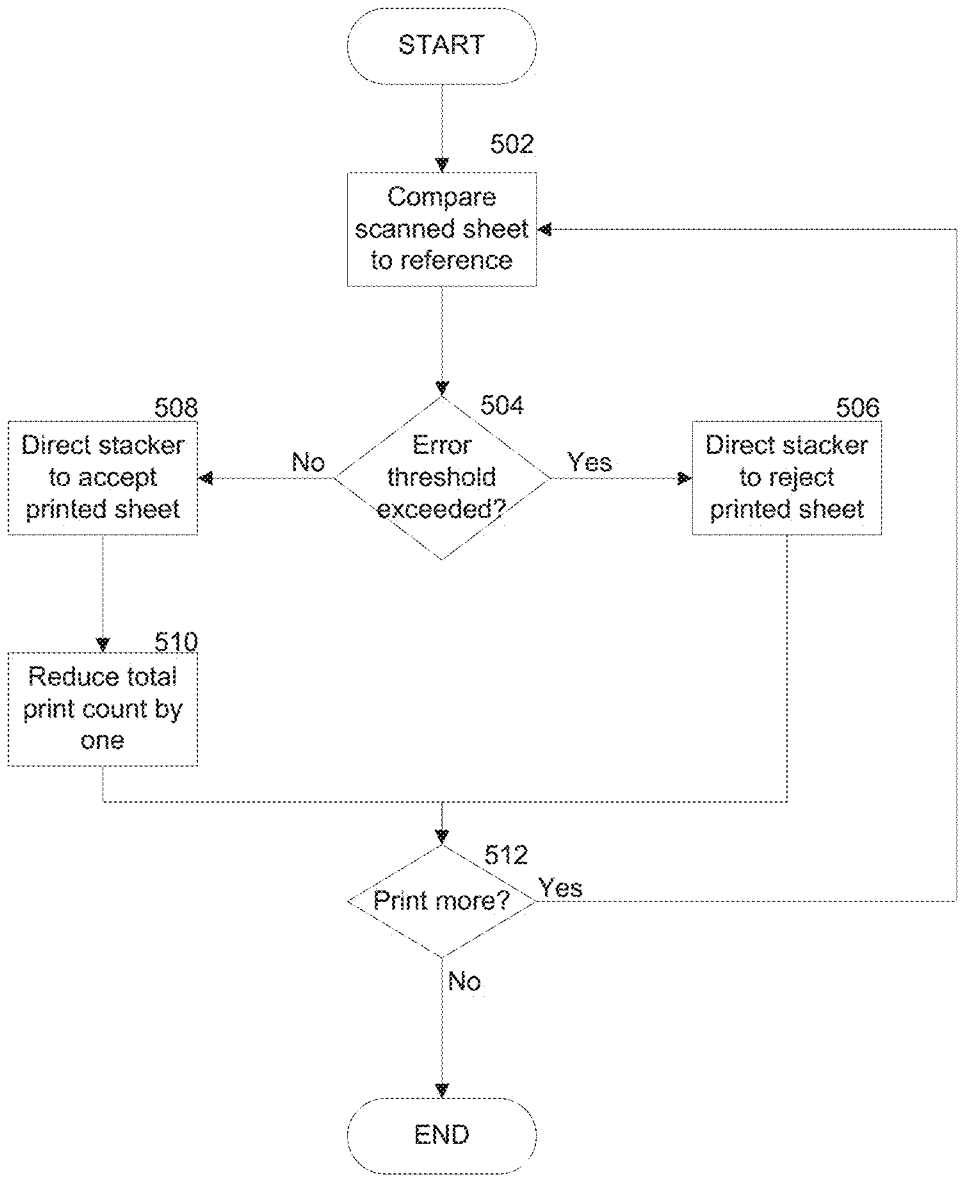
FIG. 5 is a flowchart illustrating a process of a first applied correction for a single-pass inkjet printer with a line-scan camera.

FIG. 5 is a flowchart illustrating a process of a first applied action for a single-pass inkjet printer with a line-scan camera. In step 502, the control device compares received printed sheet scans to a reference. The reference may be a specification file or a model (ideal) image of a printed sheet. The comparison uses a threshold in or to evaluate the comparison for one or more attributes deemed to be important for this print job. At a predetermined number or magnitude of variances from the reference, the printed sheet will fail the comparison. Ensuring acceptable quality through 100% inspection ensures that there is good print quality throughout an entire production run.

In step 504, the control device determines whether or not the threshold has been exceeded. Where the threshold is exceeded, in step 506, the control device directs the stacker to sort the printed sheet into a rejected repository. Conversely, where the threshold is not exceeded, in step 508, the control device directs the stacker to sort the printed sheet into an acceptable pile. In step 510, the control device reduces the count of print copies remaining by one. Thus, the print count is only reduced when the error threshold is not exceeded. In step 512, if the print request count contains more copies, the method repeats with the next printed sheet on the production line.

Figure 6:
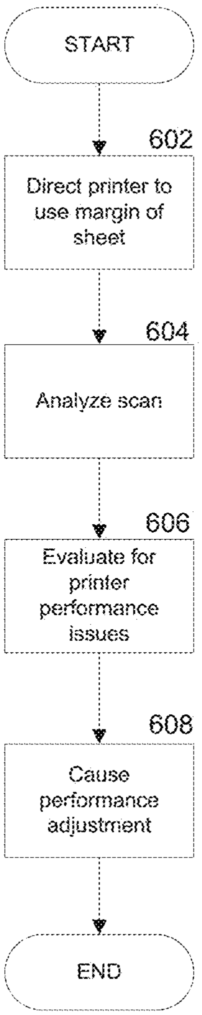
FIG. 6 is a flowchart illustrating a process of a second applied correction for a single-pass inkjet printer with a line-scan camera.

FIG. 6 is a flowchart illustrating a process of a second applied correction for a single-pass inkjet printer with a line-scan camera. The scanner can be used to read specially designed targets to optimize print quality. For example, the scanner can detect missing nozzles and effect nozzle compensation. The control device is able to measure color uniformity and effect compensations at the heads or in the raster image processor based on the sheet scans. The scanner can detect printer errors and the control device can affect automatic adjustments or report back to the operator what adjustments should be made. Importantly, these targets can be printed separately from the normal production run (on a dedicated sheet, for example) or can be imbedded (in the margins, for example) of the actual production run to get continuous feedback on these different performance attributes.

One of the actions is to identify nozzles that are not printing. In step 602, the control device directs the printer to print diagnostic targets into unused margins of sheets. The line-scan camera scans the artwork from a print request and the margin where diagnostic target for a nozzle check are printed.

In step 604, the control device analyzes the nozzle check samples. In some embodiments, an entire nozzle check does not fit into the margins of a single sheet, but over the course of multiple sheets, e.g. 5-10, the control device, through the line-scan camera is able to sample every nozzle of the inkjet. This step is performed with a comparison to a diagnostic target reference. The diagnostic target reference may be a model image or a specification file describing expected features of the diagnostic target. In step 606, the control device evaluates the scans for printer performance issues. Such issues include identifying nozzle jetting issues from a malfunction or lack of ink, printer alignment, or uniformity of density produced by print heads.

In step 608, the control device effects an operations change. An example of such an operations change would include applying a compensation algorithm. In real time, the printer can compensate for a nozzle that was detected missing, alter ink mixtures to compensate for missing inks, adjust to compensate for alignment, or to compensate for discrepancy in print head density all without shut-down or human intervention.

Figure 7:
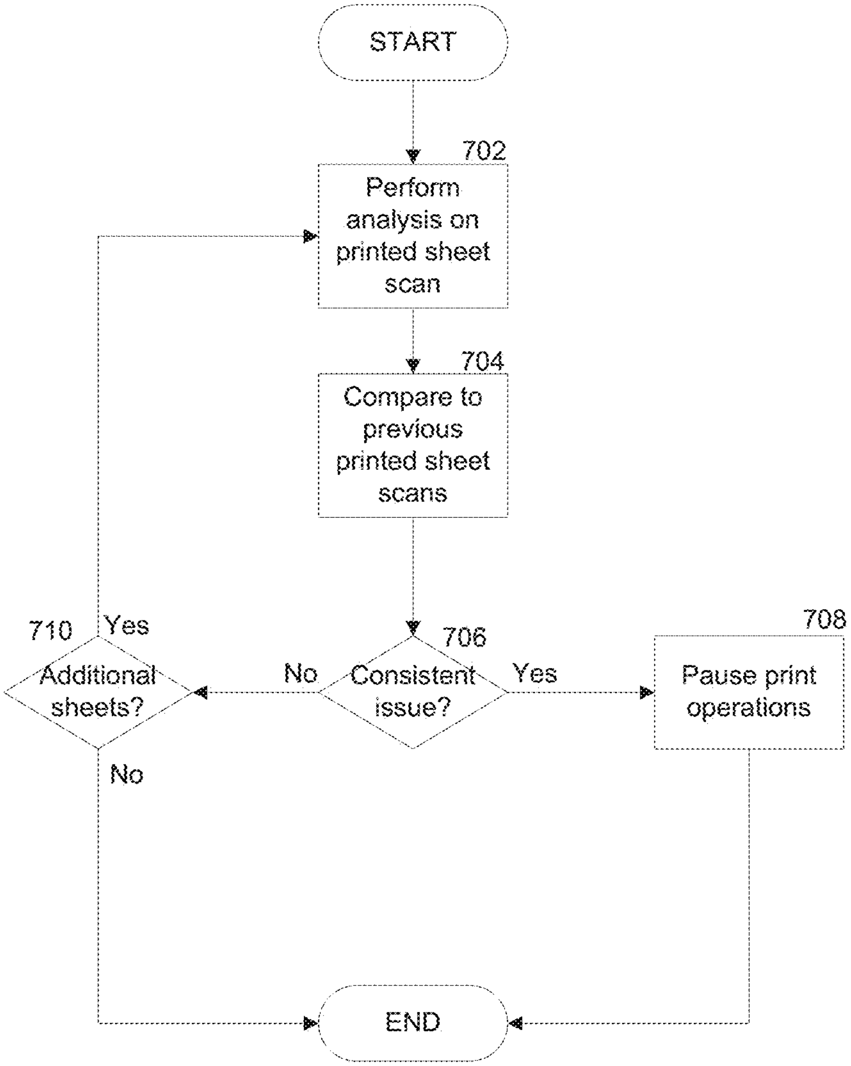
FIG. 7 is a flowchart illustrating a process of a third applied correction for a single-pass inkjet printer with a line-scan camera.

FIG. 7 is a flowchart illustrating a process of a third applied correction for a single-pass inkjet printer with a line-scan camera. In step 702, the control device analyzes a first printed sheet scan for errors. This process occurs similarly as described in FIG. 5 and the associated text. In step 704, the control device compares the analysis of the prior step (702) to previous comparisons. This generates a recent history of errors. In step 706, the control device evaluates for consistent issues. For example, if 10 sheets in a row include an inadvertent ink drip in the middle of the print, there is a consistent issue. It is unlikely that further printed sheets will suddenly no longer exhibit the issue and the printer can be directed by the system software to take some type of corrective action.

In step 708, where a consistent issue is identified, the control device may trigger the printer press to stop in order to enable the operator to perform corrective action. Upon printer stoppage, the printer may send the operator an error message indicating the reason for the stoppage to better facilitate repairs.

Alternatively, there may be actions the press can take automatically, for example, cleaning of one or more of the print heads. Otherwise, in step 710, where there are no continuous errors and more sheets to print, the analysis continues unabated.

Figure 8:
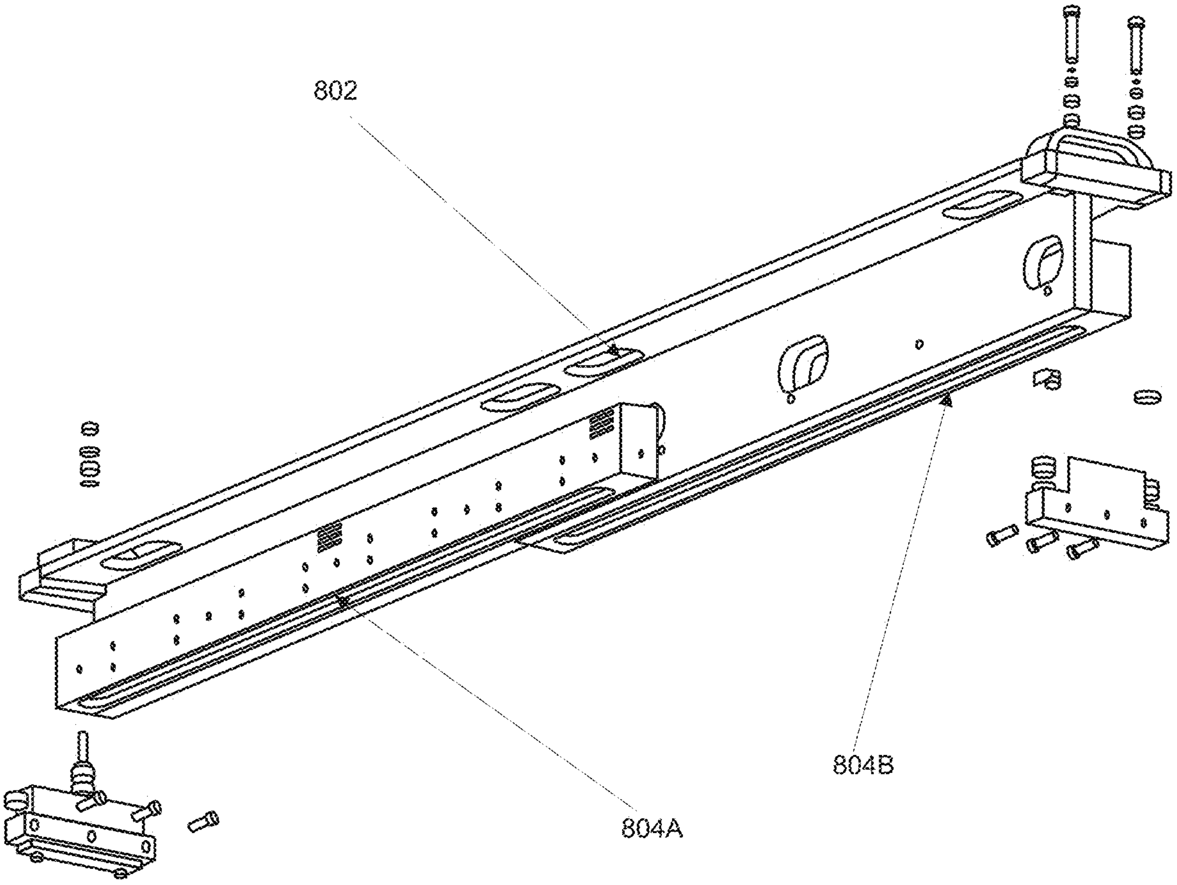
FIG. 8 shows a print head mounting bar subassembly according to the invention.

FIG. 8 shows a print head mounting bar subassembly according to the invention. The figure displays a mounting bar 802 including multiple parallel line-scan cameras 804A, 804B. It is unnecessary for a single line-scan camera to cover the width of the production line. Multiple scans of multiple line-scan cameras may be pasted together for analysis by the control device.

Figure 9:
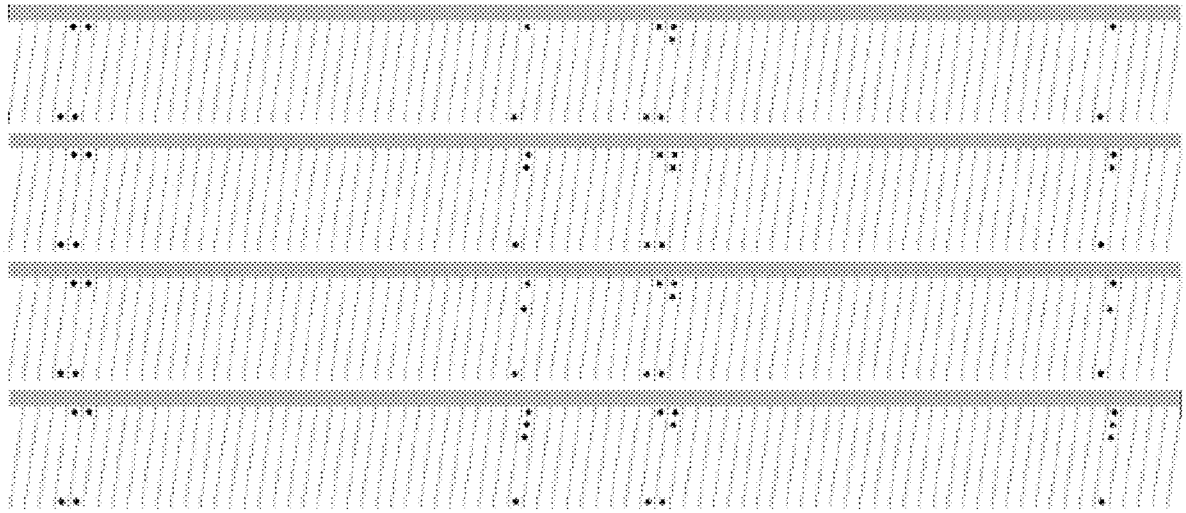
FIG. 9 shows a nozzle inspection pattern according to the invention.

FIG. 9 shows a nozzle inspection pattern according to the invention. In FIG. 9, an example nozzle test pattern is one of a plurality of patterns that can be printed and then scanned. Each line shown is printed from an individual inkjet nozzle. If the line-scan camera system determines that one or more lines is missing or shifted, then the nozzle for those lines is clogged or dirty.

Figure 10:
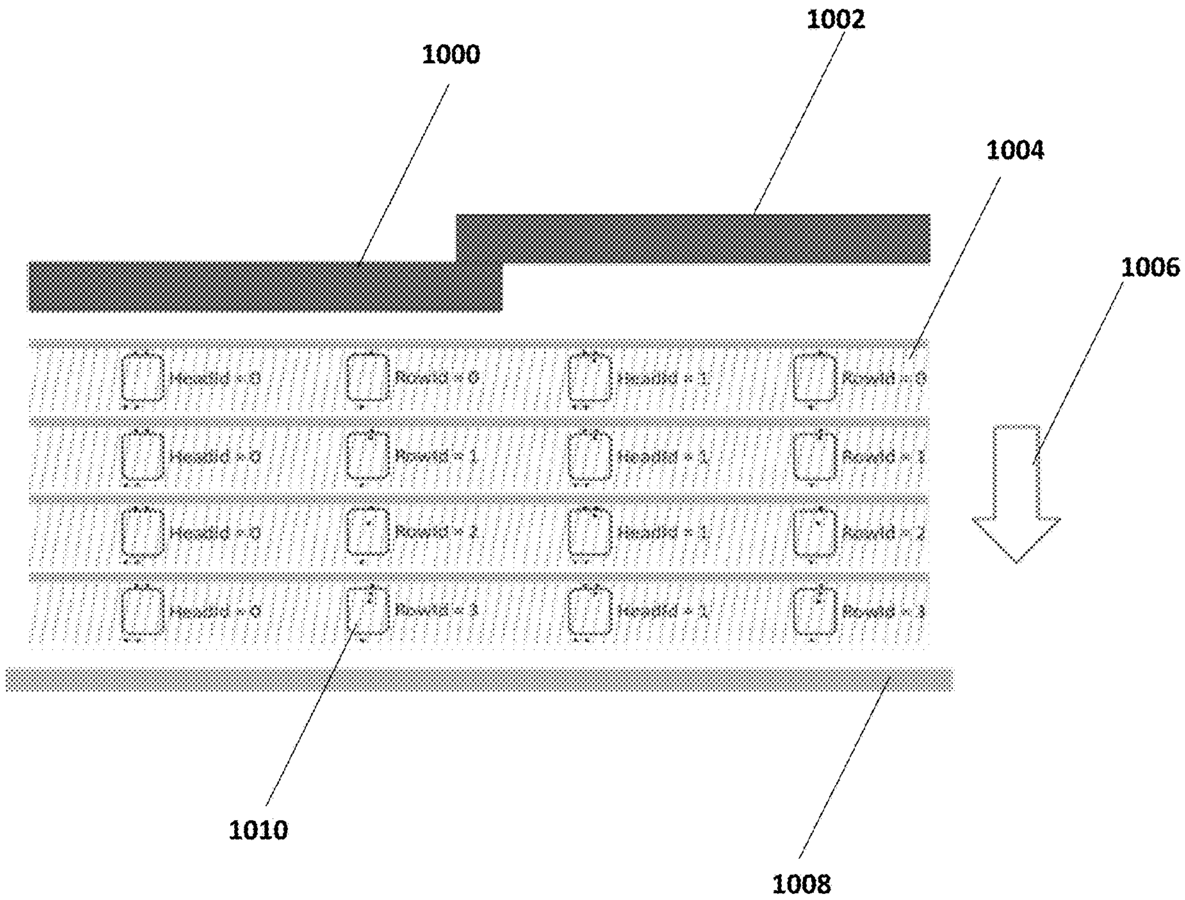
FIG. 10 shows operation of a line-scan module in connection with a nozzle inspection pattern according to the invention.

FIG. 10 shows operation of a line-scan module in connection with a nozzle inspection pattern according to the invention. This embodiment of the invention concerns operating a single-pass production line printer, in which a single-pass inkjet is positioned along a production line. The single-pass inkjet is configured to print on a print medium as the print medium is passed through the single-pass inkjet. In FIG. 10, two printheads 1000, 1002 are shown. The print medium 1004 is moved toward the line scan camera 1008 in the direction indicated by the belt movement 1006.

In this embodiment, a scan of a print medium generated by the line scan camera positioned along the production line after the single-pass inkjet identifies a region within print medium that is uniquely defined by a grid comprising the line printer's cross-process direction and the line printer's process/print output direction.

In FIG. 10, a series of marks have been placed on the print medium. These marks are all printed at the same time by a single pass of the printer. In embodiments, the reference marks can be a combination of color, e.g. a rich black-cmyk mix, to insure any missing nozzles do not affect the quality of the marks. The arrangement of marks and nozzles can be determined and assigned by a binary image file. In the binary image file, there are width×height pixels having a predetermined DPI (dots per inch). For a given area, for example one inch square, there are 300×300 pixels for DPI=300. Each pixel contains either are 1 or 0. Usually, a 0 represents indicates that the pixel is to drop inks and a 1 indicates that no ink is to be dropped on the specific pixel. In embodiments, TIFF (Tagged Image File Format) files or bundle files, which contain raw data without image headers, are two possible file formats for the binary image files.

In the example of FIG. 10 the marks are dots, where the dots that are located within an enclosed area define an individual printhead. The enclosed regions are virtual. The dots are placed on the image at its extents. After scanning, the region of interest is identified by locating the pattern of dots within the image. The image may contain multiple regions of interest, which the additional dots identify, e.g. region 1, region 2 . . . , the enclosed area in which the binary image is printed can be determined with an offset from an origin on the medium. In the example of FIG. 10, dots outside of the enclosed area, for example one of several enclosed areas 1010, are used by the line scan camera and control device to locate individual regions of interest and orient the view for skew, zoom, and rotation. In some embodiments, o locate individual regions of interest and orient the view for skew, zoom, and rotation, at least three non-colinear dots are needed (see FIG. 11). In the embodiment of FIG. 10, sixteen circles are used to illustrate the regions of interest that contain data which are used identify a specific printhead and/or row.

In FIG. 10 the dots outside of the enclosed areas indicate an individual printhead responsible for printing that region, while the additional dots within the enclosed areas are used to identify the row. In FIG. 10 there are dots within the enclosed areas for both head ID and row ID. Within the printer, the print heads are arranged in a grid. In FIG. 10, HeadID is used to identify regions across in the printer's cross-process direction and RowID is used to identify regions in the process/print output direction.

In FIG. 10, HeadID=0 has a consistent dot pattern with two dots appearing centered above the enclosed area and two dots appearing to the left below the enclosed area and HeadID=1 has a consistent dot pattern with two dots appearing centered above the enclosed area, one dot to the top right within the enclosed area, and two dots appearing to the left below the enclosed area. Thus, the line scan camera and control device can uniquely identify regions of the print medium that were printed by the printhead having HeadID=0 and the printhead having HeadID=1.

Once the region is identified any defects are located and they can be traced back to the specific printhead and nozzle. In embodiments, the printed data is then modified with a nozzle compensation algorithm to hide any defective nozzles. See, for example, U.S. Pat. No. 9,914,309, which patent is incorporated herein in its entirety by this reference thereto. Once the region is identified, HeadId and RowId can be decoded, followed by the estimated nozzle locations. Nozzle inspection can be performed both with a test page and with a print run page. For the print run page, the pattern can be split into pieces and assembled back after scanning.

Likewise, in FIG. 10 RowID=0 has a consistent dot pattern with one dot appearing centered above the enclosed area and one dot appearing to the left below the enclosed area; RowID=1 has a consistent dot pattern with dot appearing centered above the enclosed area, one dot appearing centered at the upper portion of the enclosed area, and one dot appearing to the left below the enclosed area; RowID=2 has a consistent dot pattern with dot appearing centered above the enclosed area, one dot appearing centered at an upper mid portion of the enclosed area, and one dot appearing to the left below the enclosed area; and RowID=3 has a consistent dot pattern with dot appearing centered above the enclosed area, one dot appearing centered at the upper portion of the enclosed area, one dot appearing centered at an upper mid portion of the enclosed area, and one dot appearing to the left below the enclosed area. Thus, in this exampled the line scan camera and control device can uniquely identify regions of the print medium that were printed by the printhead having HeadID=0 and the printhead having HeadID=1, as well the rows, e.g. RowID=0 to RowID=3, printed by the respective printheads. Accordingly, each region for each printhead and each row printed by each printhead is readily identified, for example, to orient the view for skew, zoom, and rotation.

While FIG. 10 shows two printheads and four rows, those skilled in the art will appreciate that any number of printheads and respective rows may be provided in the printer and this scheme may be used to identify printed regions created by such printers. Further, any number of dots can be used to provide unique identification of printheads and rows. Software associated with the line scan camera and control device detects each region based upon the chosen dot scheme. Further, the identifying characteristics of each printhead and each row need not be dots but can be squares, triangles, or other shapes. Additionally, the enclosed regions may be circles, rectangles, or any other shapes.

Figure 11:
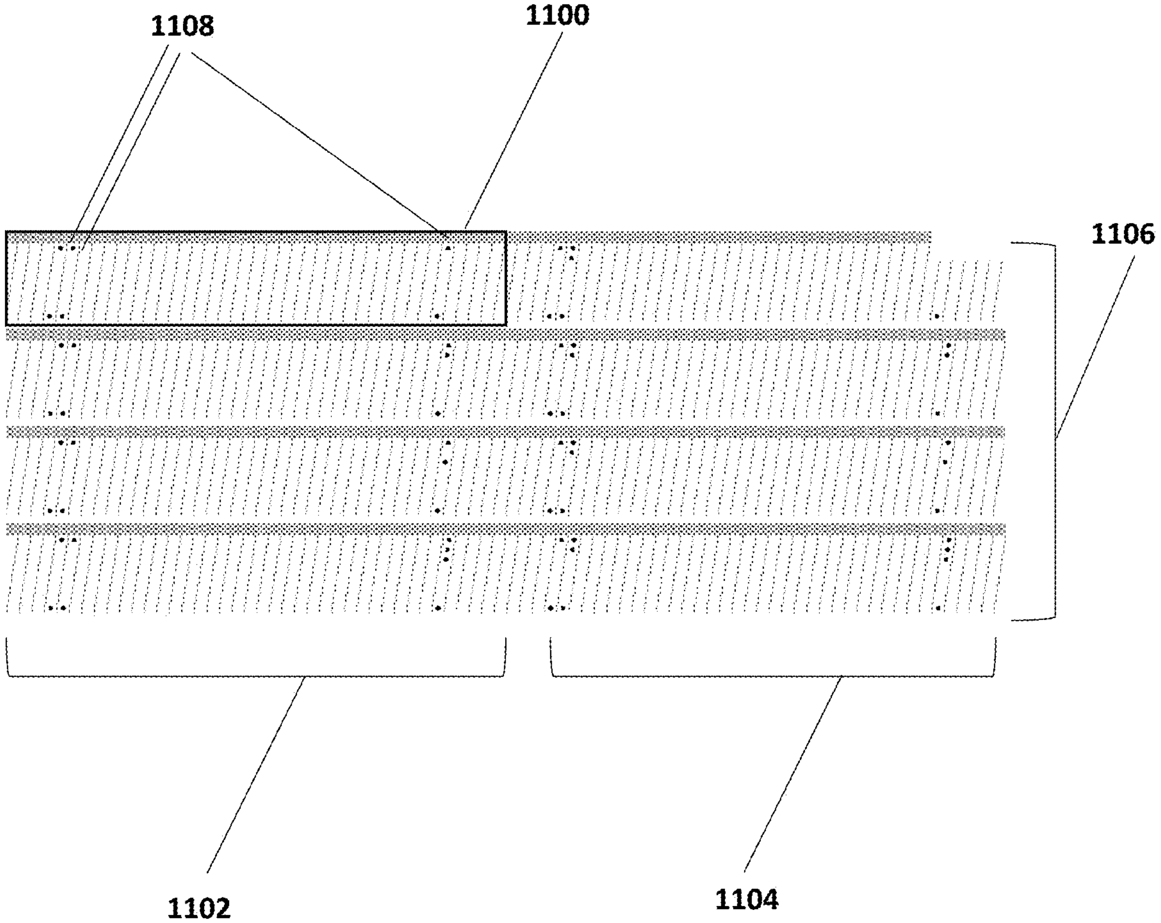
FIG. 11 shows non-colinear dots within a rectangle on the image that are needed to locate individual regions of interest and orient the view according to the invention.

FIG. 11 shows non-colinear dots within a rectangle on the image that are needed to locate individual regions of interest and orient the view. In the embodiment of FIG. 11, at least three non-colinear dots 1108 within the enclosed area 1100 are needed to locate individual regions of interest and orient the view for skew, zoom, and rotation of the first row of the first head. In FIG. 11, there are two print heads that print on the medium, each at a printhead location 1102, 1104; each head has four rows 1106. Those skilled in the art will appreciate that other arrangements and number of dots or other markers may be used to identify regions of the printed image by printhead and/or row and thereby locate defective printhead nozzles.

Computer System

Figure 12:
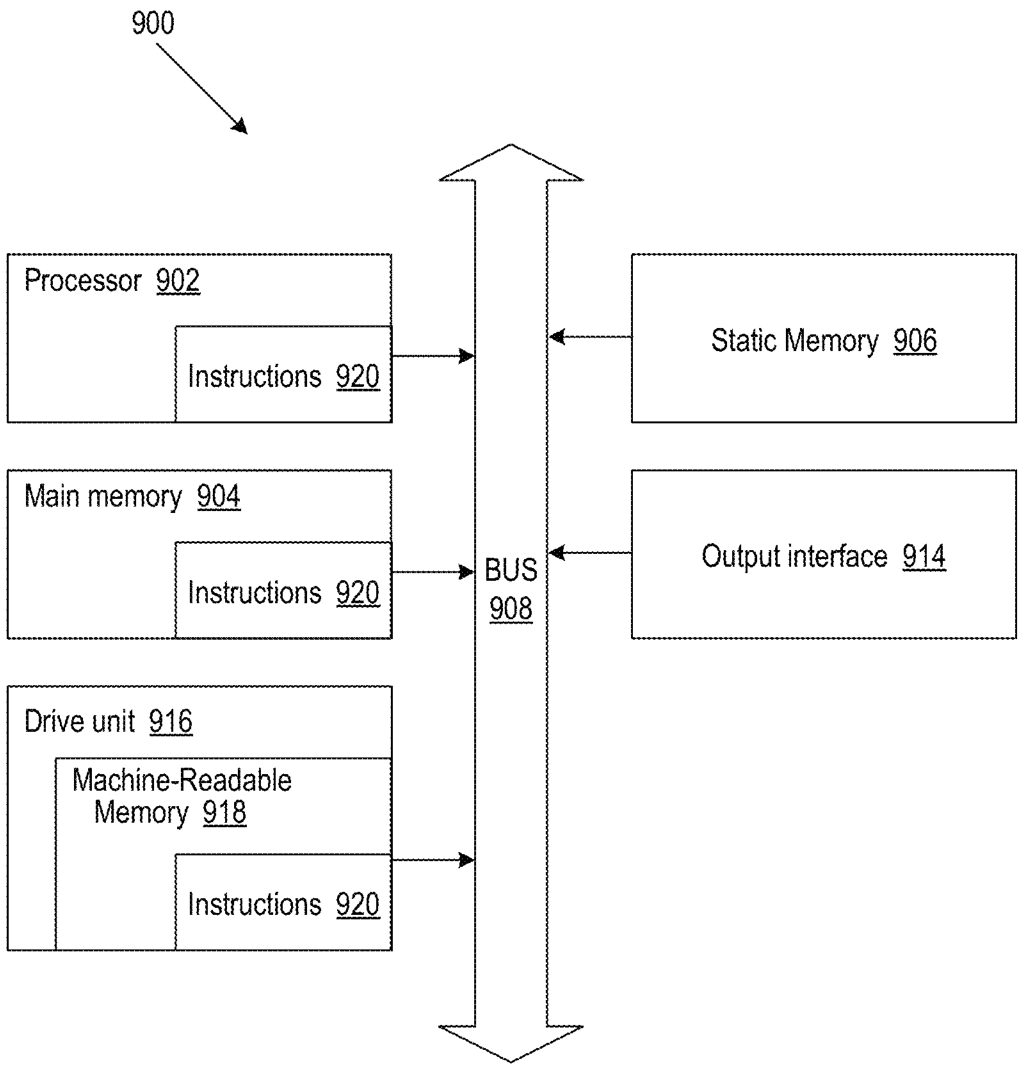
FIG. 12 shows a diagrammatic representation of a machine in the example form of a computer system within which a set of instructions for causing the machine to perform one or more of the methodologies discussed herein may be executed.

FIG. 12 shows a diagrammatic representation of a machine in the example form of a computer system 900 within which a set of instructions for causing the machine to perform one or more of the methodologies discussed herein may be executed.

The computer system 900 may act as a control device in this disclosed and includes a processor 902, a main memory 904, and a static memory 906, which communicate with each other via a bus 908. The computer system 900 also includes an output interface 914; for example, a USB interface, a network interface, or electrical signal connections and/or contacts;

The disk drive unit 916 includes a machine-readable medium 918 upon which is stored a set of executable instructions, i.e. software 920, embodying any one, or all, of the methodologies described herein. The software 920 is also shown to reside, completely or at least partially, within the main memory 904 and/or within the processor 902. The software 920 may further be transmitted or received over a network by means of a network interface device 1214.

In contrast to the system 900 discussed above, a different embodiment uses logic circuitry instead of computer-executed instructions to implement processing entities. Depending upon the particular requirements of the application in the areas of speed, expense, tooling costs, and the like, this logic may be implemented by constructing an application-specific integrated circuit (ASIC) having thousands of tiny integrated transistors. Such an ASIC may be implemented with CMOS (complementary metal oxide semiconductor), TTL (transistor-transistor logic), VLSI (very large systems integration), or another suitable construction. Other alternatives include a digital signal processing chip (DSP), discrete circuitry (such as resistors, capacitors, diodes, inductors, and transistors), field programmable gate array (FPGA), programmable logic array (PLA), programmable logic device (PLD), and the like.

It is to be understood that embodiments may be used as or to support software programs or software modules executed upon some form of processing core (such as the CPU of a computer) or otherwise implemented or realized upon or within a system or computer readable medium. A machine-readable medium includes any mechanism for storing or transmitting information in a form readable by a machine, e.g. a computer. For example, a machine-readable medium includes read-only memory (ROM); random access memory (RAM); magnetic disk storage media; optical storage media; flash memory devices; electrical, optical, acoustical or other form of propagated signals such as carrier waves, infrared signals, digital signals, etc.; or any other type of media suitable for storing or transmitting information.

Further, it is to be understood that embodiments may include performing operations and using storage with cloud computing. For the purposes of discussion herein, cloud computing may mean executing algorithms on any network that is accessible by internet-enabled or network-enabled devices, servers, or clients and that do not require complex hardware configurations, e.g. requiring cables and complex software configurations, or requiring a consultant to install. For example, embodiments may provide one or more cloud computing solutions that enable users, e.g. users on the go, to access real-time video delivery on such internet-enabled or other network-enabled devices, servers, or clients in accordance with embodiments herein. It further should be appreciated that one or more cloud computing embodiments include real-time video delivery using mobile devices, tablets, and the like, as such devices are becoming standard consumer devices.

The described embodiments are susceptible to various modifications and alternative forms, and specific examples thereof have been shown by way of example in the drawings and are herein described in detail. It should be understood, however, that the described embodiments are not to be limited to the particular forms or methods disclosed, but to the contrary, the present disclosure is to cover all modifications, equivalents, and alternative.

We claim:

1. A method of operating a single-pass production line printer, wherein a single-pass inkjet is positioned along a production line, the single-pass inkjet configured to print on a print medium as the print medium is passed through the single-pass inkjet, wherein the improvement comprises:
- identifying within an image printed on a print medium a region within said print medium that is uniquely defined by identifying marks placed within a grid comprising a cross-process direction of the line printer and/or a process/print output direction of the line printer;
- locating individual regions of interest within said print medium;
- based on said individual regions of interest within the image printed on the print medium, orienting a view of said print medium for any of skew, zoom, and rotation; and
- placing a consistent pattern of identifying marks outside of an enclosed area on said print medium to identify either regions for specific printheads across in a line printer cross-process direction or regions for specific rows in a process/print output direction.

2. The method of claim 1, wherein said identifying marks on the print medium comprise any of dots, squares, or triangles.

3. The method of claim 1, further comprising:
- said identifying marks establishing a unique HeadID pattern to identify regions for specific printheads across in a line printer cross-process direction.

4. The method of claim 1, further comprising:
- said identifying marks establishing a unique RowID pattern to identify regions for specific rows in a process/print output direction.

5. The method of claim 1, further comprising:
- for an identified region, comparing one or more of said individual regions of interest within the image printed on the print medium to a diagnostic target reference; and
- identifying printer performance issues within said identified region including any of:
  - nozzle jetting performance;
  - printer alignment; or
  - uniformity of density produced by printheads.

6. The method of claim 1, further comprising:
- identifying missing nozzles in the identified region.

7. The method of claim 6, further comprising:
- determining a nozzle has not printed satisfactorily during said missing print nozzle identification; and
- compensating with other nozzles on subsequent print media.

8. The method of claim 7, wherein said identifying a printing error occurs a plurality of times, the method further comprising:
- pausing operation of the single-pass inkjet.

9. The method of claim 8, further comprising:

directing an operator to take corrective action to perform adjustments on the single-pass inkjet.

10. The method of claim 8, further comprising:

automatically performing corrective action to the single-pass inkjet to remedy future errors.

11. A method of operating a single-pass production line printer, wherein a single-pass inkjet is positioned along a production line, the single-pass inkjet configured to print on a print medium as the print medium is passed through the single-pass inkjet, wherein the improvement comprises:

identifying within an image printed on a print medium a region within said print medium that is uniquely defined by identifying marks placed within a grid comprising the line printer's cross-process direction and/or the line printer's process/print output direction;

locating individual regions of interest within said print medium;

based on said individual regions of interest within the image printed on the print medium, orienting a view of said print medium for any of skew, zoom, and rotation; and placing a consistent pattern of identifying marks within an enclosed area on said print medium to identify either regions for specific printheads across in a line printer cross-process direction or regions for specific rows in a process/print output direction.

12. The method of claim 11, further comprising:

said identifying marks establishing a unique HeadID pattern to identify regions for specific printheads across in a line printer cross-process direction.

13. The method of claim 11, further comprising:

said identifying marks establishing a unique RowID pattern to identify regions for specific rows in a process/print output direction.

14. The method of claim 11, further comprising:

for an identified region, comparing the one or more individual regions of interest within the image printed on the print medium to a diagnostic target reference; and identifying printer performance issues within said identified region including any of:

nozzle jetting performance;

printer alignment; or uniformity of density produced by print-heads.

15. The method of claim 11, further comprising:

identifying missing nozzles in the identified region.

16. The method of claim 15, further comprising:

determining a nozzle has not printed satisfactorily during said print a nozzle identification; and compensating with other nozzles on subsequent print media.

17. The method of claim 16, wherein said identifying a printing error occurs a plurality of times, the method further comprising:

pausing operation of the single-pass inkjet.

18. The method of claim 17, further comprising:

directing an operator to take corrective action to perform adjustments on the single-pass inkjet.

19. The method of claim 17, further comprising:

automatically performing corrective action to the single-pass inkjet to remedy future errors.

20. A method of operating a single-pass production line printer, wherein a single-pass inkjet is positioned along a production line, the single-pass inkjet configured to print on a print medium as the print medium is passed through the single-pass inkjet, wherein the improvement comprises:

identifying within an image printed on a print medium a region within said print medium that is uniquely defined by identifying marks placed within a grid comprising the line printer's cross-process direction and/or the line printer's process/print output direction;

locating individual regions of interest within said print medium;

based on said individual regions of interest within the image printed on the print medium, orienting a view of said print medium for any of skew, zoom, and rotation; and for any one or more identified regions, determining whether one or more individual regions of interest within the image printed on the print medium is in within a variance threshold of a reference that matches each portion of a user-input image data, wherein the reference is based on a set of ad-hoc print run instructions and the one or more individual regions of interest within the image printed on the print medium is matched up with a portion of the reference that corresponds to a respective portion of the set of ad-hoc print run instructions.

21. The method of claim 20, wherein the reference is a model print image.

22. The method of claim 20, further comprising:

directing, by a stacker positioned on the production line, the print medium to one of a confirmed work repository or a rejected work repository based on a determination by a processor whether the print medium substantially matches the reference.

23. The method of claim 22, further comprising:

receiving, by a printer interface, a requested copy count for a particular number of print media; and causing the single-pass inkjet to print the particular number of print media and keep track of a count of completed print media, wherein the single-pass inkjet stops printing print media when the count of completed print media reaches the particular number.

24. The method of claim 23, said keeping track of said count of completed print media further comprising:

identifying a printing error on a current print medium and not incrementing the count of completed print media with respect to the current print medium.

25. The method of claim 20, further comprising:

identifying a defect within an identified region on the print medium based on a comparison of the one or more individual regions of interest within the image printed on the print medium to the reference.

26. The method of claim 20, further comprising:

effecting nozzle compensation of a plurality of nozzles on the single-pass inkjet in response to identification of a defect.

27. The method of claim 20, further comprising:

effecting nozzle compensation of a plurality of nozzles on the single-pass inkjet in response to identification of a printer performance issue within an identified region.

28. The method of claim 20, further comprising:

identifying a printing error within an identified region on the print medium based on said determining; and directing, by a production line, the print medium to a rejected work repository.

29. A printer comprising:

a production line configured to move a series of print media corresponding to a print run of a set of custom print instructions through the printer;

a single-pass inkjet, positioned along the production line and having a plurality of nozzles configured to print the set of custom print instructions on the series of print media; and an image printed on a print medium by the printer, wherein a region within the image printed on said print medium is uniquely defined by identifying marks placed within a grid comprising the line printer's cross-process direction and the line printer's process/print output direction;

wherein said identifying marks locate individual regions of interest within said print medium to orient a view of said print medium for any of skew, zoom, and rotation; and wherein a consistent pattern of identifying marks is placed outside of an enclosed area on said print medium to identify either regions for specific printheads across in a line printer cross-process direction or regions for specific rows in a process/print output direction.

30. The printer of claim 29, wherein said identifying marks on the print medium comprise any of dots, squares, or triangles.

31. The printer of claim 30, wherein said identifying marks establish a unique HeadID pattern to identify regions for specific printheads across in a line printer cross-process direction.

32. The printer of claim 29, wherein said identifying marks establish a unique RowID pattern to identify regions for specific rows in a process/print output direction.

33. The printer of claim 29, further comprising:

programmed instructions to repeatedly evaluate the single-pass inkjet performance based on the identified regions of each of the series of print media and identify errors on the print media based on a reference, wherein the reference is based on the set of custom print instructions.

34. The printer of claim 33, further comprising:

nozzle configuration instructions configured to effect nozzle compensation of the plurality of nozzles in response to identifying errors in identified regions on the print media.

35. The printer of claim 33, further comprising:

a printer interface including controls that enable requesting print orders of a particular copy count wherein the printer interface is configured to cause the printer to generate a number of print media matching a particular size not identified as containing errors.

36. The printer of claim 33, wherein the production line further comprises:

a stacker positioned on the production line and configured to direct the print media to one of a completed work repository or a discarded work repository based on identification of errors on the print media.

37. A printer comprising:

a production line configured to move a series of print media corresponding to a print run of a set of custom print instructions through the printer;

a single-pass inkjet, positioned along the production line and having a plurality of nozzles configured to print the set of custom print instructions on the series of print media; and an image printed on a print medium by the printer, wherein a region within the image printed on said print medium is uniquely defined by identifying marks placed within a grid comprising the line printer's cross-process direction and the line printer's process/print output direction;

wherein said identifying marks locate individual regions of interest within said print medium to orient a view of said print medium for any of skew, zoom, and rotation; and wherein a consistent pattern of identifying marks is placed within an enclosed area on said print medium to identify either regions for specific printheads across in a line printer cross-process direction or regions for specific rows in a process/print output direction.

38. The printer of claim 37, further comprising:

programmed instructions to repeatedly evaluate the single-pass inkjet performance based on the identified regions of each of the series of print media and identify errors on the print media based on a reference, wherein the reference is based on the set of custom print instructions.

39. The printer of claim 38, further comprising:

nozzle configuration instructions configured to effect nozzle compensation of the plurality of nozzles in response to identifying errors in identified regions on the print product.

40. The printer of claim 38, further comprising:

a printer interface including controls that enable requesting print orders of a particular copy count wherein the printer interface is configured to cause the printer to generate a number of print media matching a particular size not identified as containing errors.

41. The printer of claim 38, wherein the production line further comprises:

a stacker positioned on the production line and configured to direct the print media to one of a completed work repository or a discarded work repository based on identification of errors on the print media.

* * * * *